United States Patent
Wu et al.

(10) Patent No.: US 9,522,513 B2
(45) Date of Patent: Dec. 20, 2016

(54) DISPLAY PANEL

(71) Applicant: Innolux Corporation, Chu-Nan (TW)

(72) Inventors: Shih-Hsiung Wu, Chu-Nan (TW); Jui-Chu Lai, Chu-Nan (TW); Lung-Sheng Sun, Chu-Nan (TW); Chih-Hua Chang, Chu-Nan (TW); Wen-Kuei Jao, Chu-Nan (TW)

(73) Assignee: INNOLUX CORPORATION, Chu-Nan (TW)

(*) Notice: Subject to any disclaimer, the term of this patent is extended or adjusted under 35 U.S.C. 154(b) by 0 days.

(21) Appl. No.: 14/666,191

(22) Filed: Mar. 23, 2015

(65) Prior Publication Data
US 2015/0306841 A1  Oct. 29, 2015

Related U.S. Application Data
(60) Provisional application No. 61/986,073, filed on Apr. 29, 2014.

(30) Foreign Application Priority Data
Jul. 22, 2014  (TW) .............................. 103125066 A

(51) Int. Cl.
| | | |
|---|---|---|
| *G02F 1/1339* | (2006.01) | |
| *B32B 3/26* | (2006.01) | |
| *B32B 7/14* | (2006.01) | |
| *B32B 15/04* | (2006.01) | |

(52) U.S. Cl.
CPC ................. *B32B 3/266* (2013.01); *B32B 7/14* (2013.01); *B32B 15/04* (2013.01); *B32B 2307/206* (2013.01); *B32B 2307/412* (2013.01); *B32B 2457/20* (2013.01); *G02F 1/1339* (2013.01)

(58) Field of Classification Search
CPC .................. H01L 2224/48091; H01L 51/5246; H01L 51/524; H01L 23/3107; H01L 24/05; H01L 33/56; G02F 1/1339; G02F 1/133351; G02F 1/1341; G02F 1/133377; G02F 1/161; G02F 2001/133311; G02F 2202/28
USPC ........................... 349/153, 138; 156/60, 293
See application file for complete search history.

(56) References Cited

U.S. PATENT DOCUMENTS

| | | | |
|---|---|---|---|
| 7,629,746 B2 * | 12/2009 | Yoo ......................... | H01J 9/261 313/582 |
| 2004/0239864 A1 * | 12/2004 | Asakawa .............. | G02F 1/1339 349/153 |
| 2010/0079718 A1 * | 4/2010 | Sekiya .............. | G02F 1/133512 349/153 |

* cited by examiner

*Primary Examiner* — Thoi Duong
(74) *Attorney, Agent, or Firm* — Rabin & Berdo, P.C.

(57) ABSTRACT

A display panel is provided. The display panel comprises a first substrate, a second substrate and a sealant. The first substrate has a display area. The second substrate is opposite to the first substrate. The sealant is disposed between the first substrate and the second substrate, and surrounds and encloses the display area. The sealant comprises a plurality of node portions and a plurality of strip portions. The maximum width of the node portion is larger than the width of the strip portion. The node portions include a first node portion. The first node portion and two strip portions adjacent thereto form a first angle facing the display area. The first angle is larger than 90 degree.

12 Claims, 4 Drawing Sheets

DISPLAY PANEL

This application claims the benefit of U.S. provisional application Ser. No. 61/986,073, filed Apr. 29, 2014, and the benefit of Taiwan application Serial No. 103125066, filed Jul. 22, 2014, the subject matters of which are incorporated herein by reference.

BACKGROUND OF THE INVENTION

1. Field of the Invention

The invention relates in general to a display panel, and more particularly to a non-rectangular display panel.

2. Description of the Related Art

Generally known display panel is mainly composed of an array substrate and an opposite substrate. The opposite substrate is opposite to the array substrate and is sealed by colloidal such as sealant or glass cement. Referring to FIG. 1, a plane view of a generally known display panel 1 is shown. The display panel 1 comprises a display area 11. The sealant 30 surrounds the display area 11. Conventional sealant dispenser dispenses the sealant 30 at a constant flow rate, and can only move along a horizontal direction and a vertical direction due to the biaxial design. Due to the above restrictions, the dispensed sealant 30 forms a circular arc at the corner R, the sealant 30 forms a rectangle with rounded corners after surrounding the display area for one circle. Therefore, the display panel 1 and the display area 11 thereof must also be rectangular to match the pattern of the sealant 30. However, along with the popularity of portable electronic devices, wearable electronic devices and automotive electronic devices, featured by lightweight, slimness and compactness, rectangular shape alone cannot meet the growing needs of diversity.

Furthermore, since the circular arc sealant 30 at the corner R contracts, the border area needs to be enlarged. To the worse, if the dispensing of sealant is not properly controlled, the sealant 30 at the corner R may contract to the interior of the display area 11 and deteriorate product quality and conformity rate.

Therefore, how to provide a display panel whose sealant has special pattern and at the same time not restricted by the sealant dispenser or the manufacturing process has become a prominent task for the industries.

SUMMARY OF THE INVENTION

The invention is directed to a display panel. In an embodiment of the invention, the sealant of the display panel of comprises a plurality of node portions and a plurality of strip portions. The node portion is interposed at the junction between two adjacent strip portions. Each node portion and two strip portions adjacent thereto form an angle. These angles are larger than 90 degrees. Under such design, the sealant can achieve irregular pattern, and the display panel using the same also can achieve irregular pattern.

According to one embodiment of the present invention, a display panel is provided. The display panel comprises a first substrate, a second substrate and a sealant. The first substrate has a display area. The second substrate is opposite to the first substrate. The sealant is disposed between the first substrate and the second substrate, and surrounds and encloses the display area. The sealant comprises a plurality of node portions and a plurality of strip portions. A maximum width of each node portion is larger than a width of each strip portion. Each node portion is interposed at a junction between two adjacent strip portions. The node portions include a first node portion. The first node portion and two strip portions adjacent thereto form a first angle facing the display area. The first angle is larger than 90 degree.

The above and other aspects of the invention will become better understood with regard to the following detailed description of the preferred but non-limiting embodiment (s). The following description is made with reference to the accompanying drawings.

BRIEF DESCRIPTION OF THE DRAWINGS

FIGS. 3 to 7 show a plane view of different examples of sealant pattern of the display panel of.

DETAILED DESCRIPTION OF THE INVENTION

Figure 1:
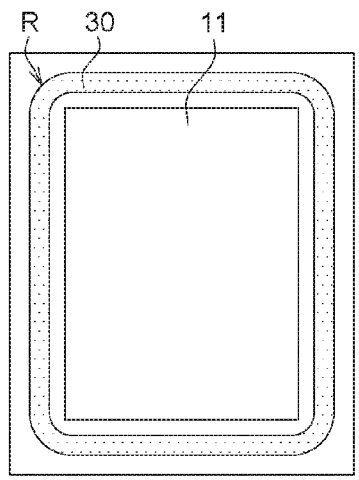
FIG. 1 is a plane view of a generally known display panel.

A number of embodiments are disclosed below with accompanying drawings for elaborating the invention. Common reference numerals are used throughout the drawings and the detailed description to indicate the same elements. It is to be understood that the drawings are simplified so as to provide clear descriptions of the embodiments of the invention, and detailed structures disclosed in the embodiments of the invention are for detailed descriptions only, not for limiting the scope of protection of the invention, and anyone who is skilled in the technology field of the invention can make necessary modifications or variations according to actual needs in implementation.

Figure 2A:
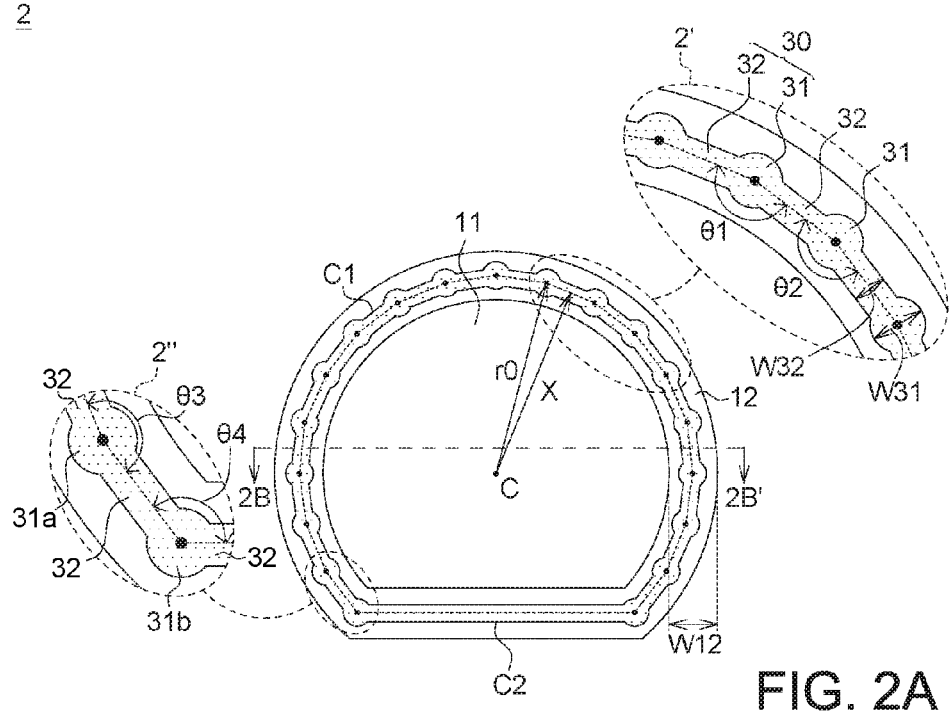
FIG. 2A is a plane view of a display panel according to an embodiment of the invention.
Figure 2B:
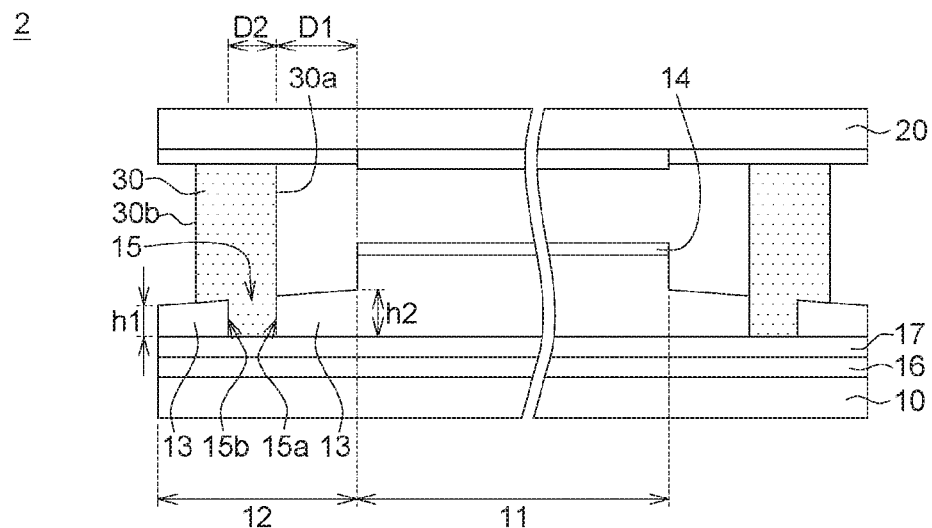
FIG. 2B is a cross-sectional view of the display panel of FIG. 2A.

Refer to FIG. 2A and FIG. 2B at the same time. FIG. 2A is a plane view of a display panel 2 according to an embodiment of the invention. FIG. 2B is a cross-sectional view of the display panel 2 of FIG. 2A along a cross-sectional line 2B-2B'. The display panel 2 comprises a first substrate 10, a second substrate 20 and a sealant 30. The first substrate 10 has a display area 11. The second substrate 20 is opposite to the first substrate 10. The sealant 30 is disposed between the first substrate 10 and the second substrate 20 for bonding the first substrate 10 and the second substrate 20. The sealant 30 surrounds and encloses the display area 11, and comprises a plurality of node portions 31 and a plurality of strip portions 32. A maximum width W31 of each node portion 31 is larger than a width W32 of each strip portion 32. Each node portion 31 is interposed at the junction between two strip portions 32 adjacent to the node portion 31. Each node portion 31 and two strip portions 32 adjacent thereto form an angle, such as angles θ1 and θ2, on one side near the display area 11. These angles θ1 and θ2 are larger than 90 degrees. In an embodiment, the angles θ1 and θ2 may not be equivalent.

In the display panel 2 of the present embodiment, by adjusting the angle formed on one side near the display area 11 by the node portion 31 of the sealant 30 and two strip portions 32 adjacent to the node portion 31, conventional sealant dispenser can achieve various patterns of different geometric shapes, such as irregular shapes. The patterns of different geometric shapes can be taken in conjunction with different geometric shapes of the display area 11 of the first substrate 10 to achieve different geometric shapes of the display panel 2. Since the angles θ1, θ2 are larger than 90 degrees, the sealant 30 is less likely to contract towards the display area 11, the panel space can be utilized more efficiently, and product quality and conformity rate can thus be increased.

Referring to FIG. 2A, the display panel 2 is the major segment of a circle dissected by a string. The string dissects the circle into two portions, and the major segment is the larger one of the two portions. The sealant 30 surrounds the display area 11, and also has a shape of the major segment. The sealant 30 is dispensed on the first substrate 10 (illustrated in FIG. 2B) by such as a sealant dispenser. For example, the coordinates of each node portion 31 along the horizontal direction and the vertical direction (the X-axis and the Y-axis) are calculated first. Then, the sealant pattern as indicated in FIG. 2A can be formed by moving the sealant dispenser clockwise or anti-clockwise to each node portion 31.

As indicated in FIG. 2A, the pattern of the sealant 30 is similar to the major segment of a circle dissected by a string. The string divides the circle into a circumferential portion C1 and a string portion C2. The sealant 30 comprises a plurality of node portions 31 and a plurality of strip portions 32. Each node portion 31 is interposed at the junction between two strip portions 32 adjacent thereto. The strip portion 32 is a straight line segment connecting two adjacent node portions 31. The sealant dispenser moves continuously to dispense the sealant 30. During the conversion of proceeding direction, since the sealant dispenser has a longer response time at each node portion 31 and dispenses extra sealant 30, the maximum width W31 of the node portion 31 will be larger than the width W32 of the strip portion 32. The node portion 31 and two strip portions 32 adjacent thereto form an angle on one side near the display area 11 (such as angles θ1 and θ2). The angles θ1 and θ2 are preferably larger than 90 degrees, such that the sealant 30 will not be contracted inwardly towards the display area 11 at the angles θ1 and θ2 and cause pollution. In the circumferential portion C1 of the sealant 30 (such as the enlarged area 2'), the angles θ1 and θ2 formed by each node portion 31 and two strip portions 32 adjacent thereto have the same measure. However, at the junction between the circumferential portion C1 and string portion C2 of the sealant 30 (such as the enlarged area 2"), the node portions include a first node portion 31a and a second node portion 31b. The first node portion 31a and two strip portions 32 adjacent thereto form a first angle θ3 facing the display area 11. The first angle θ3 is larger than 90 degree. The second node portion 31b and two strip portions 32 adjacent thereto form a second angle θ4 facing the display area 11. The second angle θ4 is smaller than the first angle θ3. A maximum width of the first node portion 31a which is at a vertex of the first angle θ3 is smaller than a maximum width of the second node portion 31b which is at a vertex of the second angle θ4. By adjusting the angle formed by the node portion 31 of the sealant 30 and two strip portions 32 adjacent to the node portion, the irregular pattern of the sealant can be achieved for manufacturing display panels having different shapes other than the rounded rectangle formed by using generally known technology (refer to FIG. 1).

As indicated in FIG. 2A, the pattern of the sealant 30 is similar to the major segment of a circle dissected by a string. The pattern of the sealant 30 has a geometric center C which is the center of the circle. The node portions 31 on the circumference of the circle are arranged at an equal interval. For example, the node portions 31 within the enlarged area 2' are arranged at an equal interval. That is, each node portion 31 on the circumference of the circle has the same central angle, and every two adjacent node portions 31 are connected by a strip portion 32. That is, the pattern of the sealant 30 replaces the arc shape with the straight line segment of the strip portion 32. The difference between the distance r0 from the geometric center C to the node portion 31 (that is, the radius of the circle) and the vertical distance X from the geometric center C to the strip portion 32 adjacent thereto (that is, the shortest distance) is referred as design deviation between the circumferential portion of the sealant 30 and the circumference of the circle. The design deviation is the extent to which the strip portion 32 of the sealant 30 contracts inwardly from the arc. The extent of design deviation can be adjusted by changing the number of node portions 31 on the circumference. As the number of node portions 31 on the circumference increases, the strip portions 32 get closer to the arc and the design deviation diminishes.

In an embodiment, the design deviation of the sealant 30 preferably is smaller than 50 micrometers (μm), but the invention is not limited thereto. The design deviation of the sealant 30 has much to do with the width of the border area 12 of the display panel 2. The width W12 of the border area 12 is the distance from the edge of the display area 11 to the edge of the display panel 2. As the width W12 of the border area 12 decreases (such as the narrow border area design), the design deviation also needs to decrease to avoid the sealant 30 being overflown to the display area 11 during the dispensing of the sealant 30. In practical design, when the design deviation is larger than 50 μm, the shape of the sealant 30 is closer to a polygon than a circular arc. Therefore, when the pattern of circular arc is considered, the design deviation also needs to be taken into consideration.

FIG. 2B is a cross-sectional view of the display panel 2 of FIG. 2A along a cross-sectional line 2B-2B'. As indicated in FIG. 2B, the display panel 2 comprises a first substrate 10, an insulation layer 16, a metal layer 17, a flat layer 13, a transparent electrode layer 14, a second substrate 20 and a sealant 30. The first substrate 10 is an active array substrate such as a TFT substrate. The first substrate 10 has a display area 11 and a border area 12. The display area 11 is located at the center of the first substrate 10. The border area 12 from the edge of the display area 11 to the edge of the first substrate 10 surrounds the edge of the display area 11. In an embodiment, the insulation layer 16 and the metal layer 17 are disposed on the first substrate 10 in order. The flat layer 13 is disposed on the metal layer 17. The metal layer 17 of the border area 12 and the metal layer 17 of the display area 11, such as scan lines, gate lines or data lines, can be on the same layer, and can be formed in the same manufacturing process. The transparent electrode layer 14 is disposed on the flat layer 13. The flat layer 13 has an opening 15 on the border area 12. The opening 15 penetrates the flat layer 13 and exposes the metal layer 17. The sealant 30 is disposed in the opening 15. The opening 15 restricts the position of the sealant 30 to avoid the sealant 30 being diffused inwardly and polluting the display area 11 or being diffused outwardly and overflowing the display panel 2. With the design of the opening 15 restricting the position of the sealant 30, the width of the border area 12 can be reduced. Furthermore, with the design of the opening 15 enabling the sealant 30 to directly lean on the metal layer 17, the risk of the sealant 30 being peeled off as well when the flat layer 13 is peeled off the metal layer 17 can thus be avoided.

As indicated in FIG. 2B, since the opening 15 exposes the first substrate 10 underneath, the inner edge 15a of the opening 15 needs to be separated from the edge of the transparent electrode layer 14 by a distance D1 to avoid the transparent electrode layer 14 and the first substrate 10 being conducted and becoming short-circuited. The inner edge 15a of the opening 15 refers to one side of the opening 15 adjacent to the transparent electrode layer 14. In an embodiment, the distance D1 from the inner edge 15a of the opening 15 to the edge of the transparent electrode layer 14 preferably is between 10 µm and 100 µm.

As indicated in FIG. 2B, the flat layer 13 can be inclined on a top surface of the border area 12. In the border area 12, the height h2 of the part of the flat layer 13 adjacent to the display area 11 is larger than the height h1 of the part of the flat layer 13 adjacent to the edge of the first substrate 10. The inclined flat layer 13 can be formed by using such as a gray tone mask (GTM). Details of the manufacturing process are generally known to anyone who is skilled in the technology field of the invention, and are not repeated here. After the opening 15 is formed, each of the inner edge 15a and the outer edge 15b of the opening 15 has an inclined flat layer 13. The outer edge 15b of the opening 15 refers to one side of the opening 15 away from the transparent electrode layer 14. As the flat layer 13 gets closer to the display area 11, the height of the inclined flat layer 13 located on the inner edge 15a of the opening 15 increases to avoid the sealant 30 being diffused towards the display area 11 and generating pollution. As the flat layer 13 gets close to the edge of the first substrate 10, the height of the flat layer 13 located on the outer edge 15b of the opening 15 decreases such that the sealant 30 is diffused towards the edge of the first substrate 10. The distance D2 between the inner edge 15a and the outer edge 15b of the opening 15 preferably is between 150 µm and 400 µm. That is, the width of the sealant 30 is larger than the width of the opening 15. Due to the restriction by the opening 15, the sealant 30 will not overflow the edge of the first substrate 10, and a part of the sealant 30 is disposed on the flat layer 13. In general, when the display panel is cut, if the cut has residues of sealant, due to the strong adhesion between the sealant and the substrate, the cutting knife is likely to drag the substrate and damage the display panel. According to the present embodiment of the invention, a part of the sealant 30 is disposed on the flat layer 13. Since the adhesion between the sealant 30 and the flat layer 13 is weaker, if the cut has residues of sealant 30 at the overlapping between the sealant 30 and the flat layer 13, the display panel 2 will not be damaged by the weak adhesion between the sealant 30 and the flat layer 13.

The sealant 30 seals the display panel 2 and avoids the internal elements being interfered with by impurities such as moisture. In order to produce the display panel 2 whose display area 11 has a non-rectangular pattern, the sealant 30 needs to be dispensed along a non-rectangular display area 11. A number of embodiments of the display panel are exemplified below with accompanying drawings FIG. 3 to FIG. 7.

Figure 3:
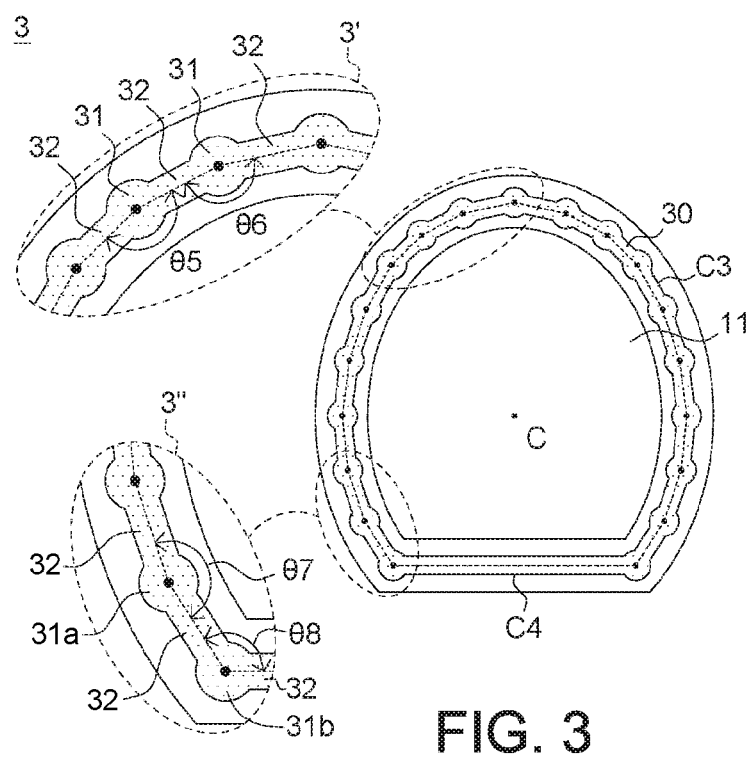

FIG. 3 is a plane view of a display panel 3 according to an embodiment of the invention. As indicated in FIG. 3, the pattern of the display panel 3 and the sealant 30 is a truncated ellipse. The sealant 30 comprises an elliptical circumferential portion C3 and a string portion C4. On the elliptical circumferential portion C3, referring to the enlarged area 3', each of angles θ5 and θ6 is formed by a node portion 31 and two strip portions 32 adjacent thereto, and the angles θ5 and θ6 are not equivalent. At the junction between the elliptical circumferential portion C3 and the string portion C4 of the sealant 30, referring to the enlarged area 3", the node portions include a first node portion 31a and a second node portion 31b. The first node portion 31a and two strip portions 32 adjacent thereto form a first angle θ7 facing the display area 11. The first angle θ7 is larger than 90 degree. The second node portion 31b and two strip portions 32 adjacent thereto form a second angle θ8 facing the display area 11. The second angle θ8 is smaller than the first angle θ7. A maximum width of the first node portion 31a which is at a vertex of the first angle θ7 is smaller than a maximum width of the second node portion 31b which is at a vertex of the second angle θ8.

Since each of the angles θ5 and θ6 formed by a node portion 31 and two strip portions 32 adjacent thereto is larger than 90 degrees, the extent to which the sealant 30 contracted towards the display area 11 can be reduced, thin frame design can be achieved, and the space inside the sealant 30 can be more efficiently used as the display area 11.

Figure 4:
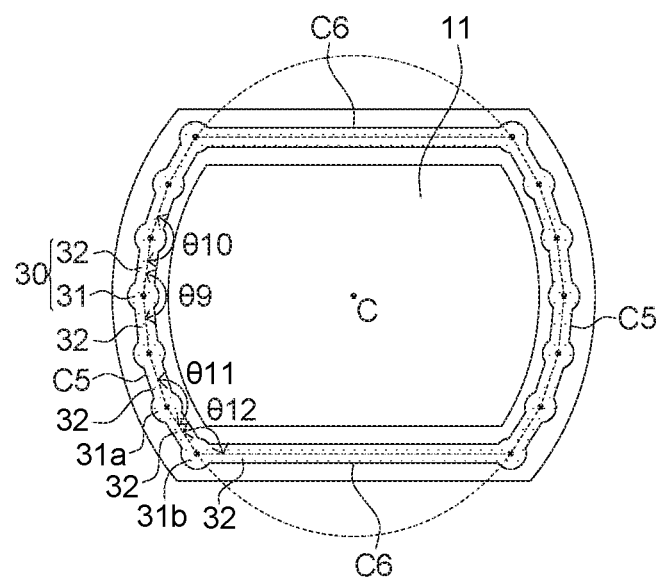

FIG. 4 is a plane view of a display panel 4 according to another embodiment of the invention. The display panel 4 of FIG. 4 is similar to the display panel 3 of FIG. 3 except that the display panel 4 of FIG. 4 is dissected by two parallel strings. In the elliptical circumferential portion C5 of the sealant 30 of the display panel 4, such as the arc at the left hand side and the right hand side of FIG. 4, each of angles θ9, θ10 is formed by a node portion 31 and two strip portions 32 adjacent thereto, and the angles θ9, θ10 are not equivalent. At the junction between the elliptical circumferential portion C5 and the string portion C6 of the sealant 30 (such as the bottom left corner of FIG. 4), the node portions include a first node portion 31a and a second node portion 31b. The first node portion 31a and two strip portions 32 adjacent thereto form a first angle θ11 facing the display area 11. The first angle θ11 is larger than 90 degree. The second node portion 31b and two strip portions 32 adjacent thereto form a second angle θ12 facing the display area 11. The second angle θ12 is smaller than the first angle θ11. A maximum width of the first node portion 31a which is at a vertex of the first angle θ11 is smaller than a maximum width of the second node portion 31b which is at a vertex of the second angle θ12. Other characteristics of the display panel 4 of FIG. 4 are similar to that of the display panel 3 of FIG. 3, and are not repeated here.

Figure 5:
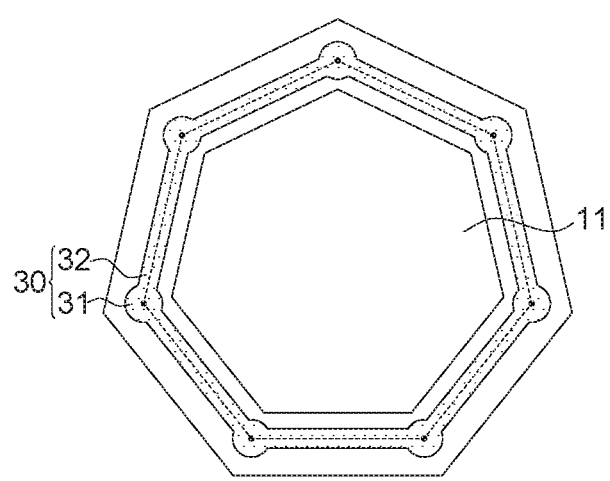

FIG. 5 is a plane view of a display panel 5 according to another embodiment of the invention. The shape of the display panel 5 of FIG. 5 is a heptagon, and the sealant 30 has special design at the seven vertexes of the heptagon. In an embodiment, a node portion 31 is added to each of the two sides of the vertex of the heptagon to avoid the problems which would otherwise arise if the turning angle is too large. If too less node portions 31 are disposed, the turning angle will become too large. During the conversion of proceeding direction, the sealant dispenser has a longer response time at each node portion 31 and dispenses extra sealant 30 at the node portion 31, making the maximum width of the node portion 31 oversized or even diffused to the display area 11. Therefore, the design of adding a node portion 31 to each side of the vertex mitigates the potential problems.

Figure 6:
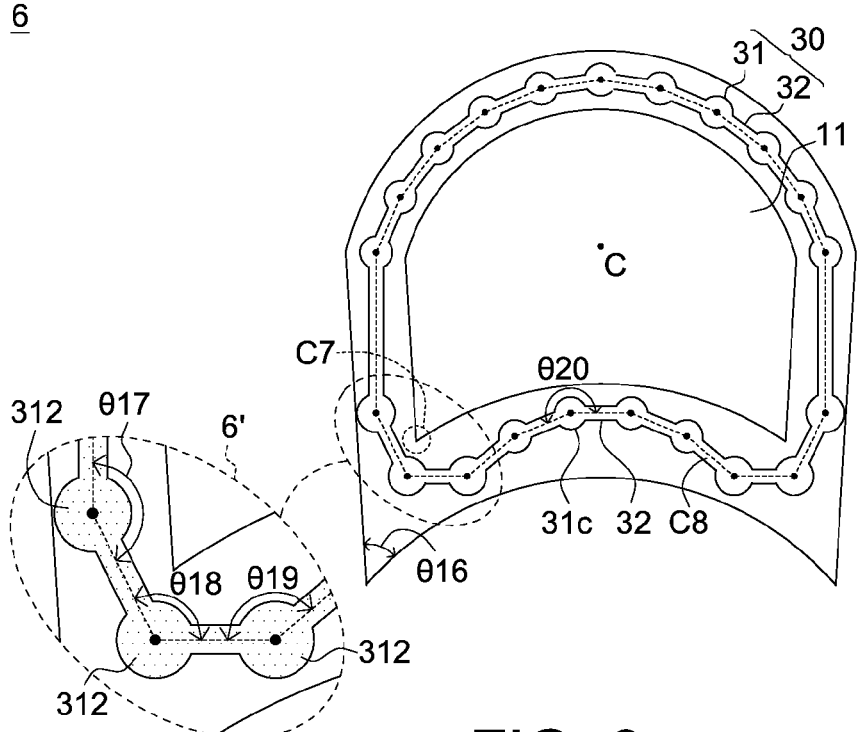

FIG. 6 is a plane view of a display panel 6 according to another embodiment of the invention. As indicated in FIG. 6, the display area 11 of the display panel 6 has a concave arc edge C8 concaving toward a geometric center C of the display area 11. The node portions 31 include a third node portion 31c corresponding to the concave arc edge C8. The third node portion 31c and two strip portions 32 adjacent thereto form a third angle θ20 facing the display area 11. The third angle θ20 is larger than 180 degree. The concave arc edge C8 is an indented portion facing the geometric center C of the display area 11. An acute angle portion C7 is formed at the part of the display area 11 connecting the concave arc edge C8. When designing the pattern of the sealant 30 in the acute angle portion C7, the acute angle can be converted into several obtuse angles through the design of a plurality of sub-node portions 312. For example, the pattern of the acute angle θ16 of the display panel 6 can be converted into 3 obtuse angles θ17, θ18, and θ19 (illustrated in the enlarged area 6') by using a plurality of sub-node portions 312. Both the obtuse angles θ17 and θ19 are larger than the obtuse angle θ18, and each of the obtuse angles θ17, θ18, and θ19 is smaller than the third angle θ20 formed on one side near the display area 11 by a node portion 31 facing the concave arc edge C8 and two strip portions 32 adjacent to the node portion. Since the shape of the acute angle is formed by a number of sub-nodes 312, the sealant dispenser needs to have a larger turning angle at the sub-nodes 312, and the width of the sub-node portion 312 will be larger than the width of the node portion 31. Based on the above design, the display panel can achieve any shapes. The sealant 30 can be formed by using a conventional biaxial sealant dispenser.

Figure 7:
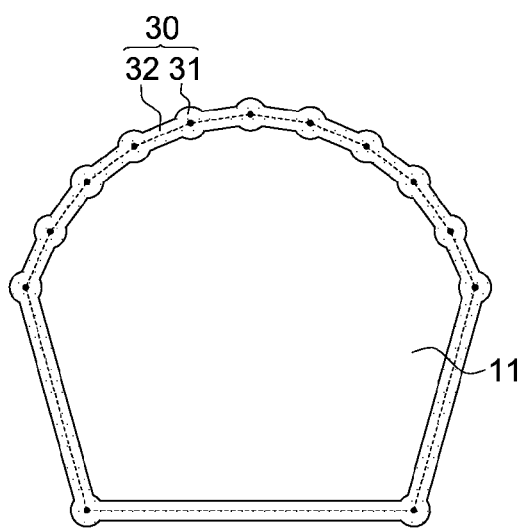

FIG. 7 is a plane view of a display panel 7 according to another embodiment of the invention. As indicated in FIG. 7, the display panel 7 has a shell-shape, and the sealant 30 of the display panel 7 has an arc edge and three straight-line edges. The junction between two straight-line edges or between one straight-line edge and one arc edge can be realized by way of direct connection as indicated in FIG. 7 or through the above design in which a plurality of sub-node portions are disposed such that the sealant 30 is dispensed more smoothly and will not contract inwardly towards the display area 11.

The sealant of the display panel disclosed in above embodiments has a special design of pattern which can be achieved by using a conventional biaxial (XY axes) sealant dispenser. Therefore, the display panel with irregular shape can be manufactured without changing the sealant dispenser. Meanwhile, in the sealant, the angle formed by each node portion and two strip portions adjacent thereto is larger than 90 degrees, such that the extent to which the sealant contracts towards the display area is reduced and the space inside the sealant can be used more efficiently.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display panel, comprising:
    a first substrate having a display area, and a border area adjacent to the display area, surrounding an edge of the display area and extending to an edge of the first substrate;
    a second substrate opposite to the first substrate;
    a sealant disposed between the first substrate and the second substrate, wherein the sealant surrounds and encloses the display area, the sealant comprises a plurality of node portions and a plurality of strip portions, a maximum width of each node portion is larger than a width of each strip portion, and each node portion is interposed at a junction between two adjacent strip portions;
    a flat layer disposed on the first substrate, wherein the flat layer disposed on the border area has an opening exposing the first substrate, and the sealant is disposed in the opening; and
    a transparent electrode layer disposed on the flat layer, wherein the opening has an inner edge adjacent to the transparent electrode layer, and a distance from the inner edge to an edge of the transparent electrode layer is between 10 μm and 100 μm;
    wherein the node portions include a first node portion, the first node portion and two strip portions adjacent thereto form a first angle facing the display area, and the first angle is larger than 90 degrees.

2. The display panel according to claim 1, wherein the node portions include a second node portion, the second node portion and two strip portions adjacent thereto form a second angle facing the display area, and the second angle is smaller than the first angle.

3. The display panel according to claim 2, wherein a maximum width of the first node portion which is at a vertex of the first angle is smaller than a maximum width of the second node portion which is at a vertex of the second angle.

4. The display panel according to claim 1, wherein the display area has a geometric center, and a distance from the geometric center to each node portion is larger than a vertical distance from the geometric center to the strip portions adjacent to the node portion.

5. The display panel according to claim 1, wherein each strip portion is a straight line segment.

6. The display panel according to claim 1, wherein a width of the sealant is larger than a width of the opening.

7. The display panel according to claim 1, wherein in the border area, a height of part of the flat layer adjacent to the display area is larger than a height of part of the flat layer adjacent to the edge of the first substrate.

8. The display panel according to claim 1, wherein the opening has an outer edge away from the transparent electrode layer, and a distance from the inner edge to the outer edge is between 150 μm and 400 μm.

9. The display panel according to claim 1, wherein the opening has an outer edge away from the transparent electrode layer, and the sealant covers part of the flat layer that is adjacent to the outer edge.

10. A display panel, comprising:
    a first substrate having a display area;
    a second substrate opposite to the first substrate; and
    a sealant disposed between the first substrate and the second substrate, wherein the sealant surrounds and encloses the display area, the sealant comprises a plurality of node portions and a plurality of strip portions, a maximum width of each node portion is larger than a width of each strip portion, and each node portion is interposed at a junction between two adjacent strip portions;
    wherein the node portions include a first node portion, the first node portion and two strip portions adjacent thereto form a first angle facing the display area, and the first angle is larger than 90 degrees;
    wherein the display area has a concave arc edge concaving toward a geometric center of the display area, the node portions include a third node portion corresponding to the concave arc edge, the third node portion and two strip portions adjacent thereto form a third angle facing the display area, and the third angle is larger than 180 degrees.

11. The display panel according to claim 10, wherein the display area has an acute angle, the sealant corresponding to the acute angle shape has a plurality of sub-node portions, and a maximum width of each sub-node portion is larger than the maximum width of the node portion.

12. A display panel, comprising:
- a first substrate having a display area and a border area adjacent to the display area, surrounding an edge of the display area and extending to an edge of the first substrate;
- a second substrate opposite to the first substrate;
- a flat layer disposed on the first substrate, wherein the flat layer disposed on the border area has an opening exposing the first substrate, and the sealant is disposed in the opening; and
- a sealant disposed between the first substrate and the second substrate, wherein the sealant surrounds and encloses the display area, the sealant comprises a plurality of node portions and a plurality of strip portions, a maximum width of each node portion is larger than a width of each strip portion, and each node portion is interposed at a junction between two adjacent strip portions;
- wherein the node portions include a first node portion, the first node portion and two strip portions adjacent thereto form a first angle facing the display area, and the first angle is larger than 90 degrees;
- wherein in the border area, a height of part of the flat layer adjacent to the display area is larger than a height of part of the flat layer adjacent to the edge of the first substrate.

* * * * *